(12) United States Patent
Tamura

(10) Patent No.: US 8,625,139 B2
(45) Date of Patent: Jan. 7, 2014

(54) IMAGE FORMING APPARATUS, SERVICE COOPERATION METHOD, AND STORAGE MEDIUM

(75) Inventor: Makiya Tamura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 202 days.

(21) Appl. No.: 13/198,004

(22) Filed: Aug. 4, 2011

(65) Prior Publication Data

US 2012/0050797 A1    Mar. 1, 2012

(30) Foreign Application Priority Data

Aug. 26, 2010 (JP) .................. 2010-189473

(51) Int. Cl.
G06F 15/00 (2006.01)
(52) U.S. Cl.
USPC ....................................... 358/1.15
(58) Field of Classification Search
USPC .............................. 358/1.13, 1.15
See application file for complete search history.

(56) References Cited

U.S. PATENT DOCUMENTS

2013/0050735 A1* 2/2013 Nuggehalli et al. ......... 358/1.13

FOREIGN PATENT DOCUMENTS

JP    2010-56770 A    3/2010

* cited by examiner

*Primary Examiner* — Saeid Ebrahimi Dehkordy
(74) *Attorney, Agent, or Firm* — Canon USA, Inc., IP Division

(57) ABSTRACT

An image forming apparatus includes a plurality of individual processing units respectively corresponding to a plurality of services that cooperate with the image forming apparatus via a network and configured to communicate with the services and perform individual processing corresponding to the services, a specifying unit configured to specify an individual processing unit corresponding to the service selected out of the plurality of services in response to a user operation from the plurality of individual processing units, and a generation unit serving as a module commonly used among the plurality of individual processing units and configured to generate screen information corresponding to the individual processing unit specified by the specifying unit based on the information managed by the individual processing unit.

8 Claims, 15 Drawing Sheets

FIG. 8

```
SERVICE A

SELECT A FILE TO BE PRINTED.    801

| FILE NAME/FOLDER NAME | SIZE  |
| ABC FOLDER            | 1.5MB |
| DEF FOLDER            | 1.5MB |
| HGI.pdf               | 1.5MB |
| JKL.pdf               | 1.5MB |
| MNO.doc               | 1.5MB |
| PQR.xls               | 1.5MB |

804                      802      803
[CANCEL]                  [SEND]  [PRINT]
```

IMAGE FORMING APPARATUS, SERVICE COOPERATION METHOD, AND STORAGE MEDIUM

BACKGROUND OF THE INVENTION

1. Field of the Invention

The present invention relates to an image forming apparatus, a service cooperation method, and a storage medium.

2. Description of the Related Art

In recent years, in an image processing apparatus, on a real time operating system (a real time OS), an execution environment directed toward another built-in system (an execution environment such as Java®) has been constructed. Owing to the execution environment directed toward the built-in system, an application for controlling the image processing apparatus can be installed from the exterior and loaded. The execution environment directed toward the built-in system enables a developer to develop the application for the image processing apparatus in a common development language and a common development environment. Further, the image processing apparatus has been made highly-functional and multifunctional and a wide variety of image processing apparatuses have also been developed for a scanning function and a printing function. In recent years, an image processing apparatus, which is loaded with not only basic functions such as computerization and printing of a paper document such as a scanning function and a printing function but also a network interface (network I/F), has been developed. An image processing apparatus, which is loaded with the network I/F, cooperates with an external system and an external service connected via a network, to provide various solutions. Japanese Patent Application Laid-Open No. 2010-56770 discusses an image processing apparatus that cooperates with a document management system and can upload only scan data that matches a document management policy.

On the other hand, a use format of a computer based on the Internet, for example, a cloud computing environment has been paid attention to in recent years with respect to a network environment surrounding the image processing apparatus. In the cloud computing environment, a user uses computer processing as a service via a network. Particularly, various services are provided from a service providing apparatus, and the user can select the service according to his/her own use format such as utility form.

Therefore, even in the image processing apparatus, it is important to provide a solution for improving efficiency of user's work in cooperation with various services.

In the cloud computing environment, a provider of the providing apparatus that provides the services and a provider of the image processing apparatus are not necessarily associating in a cooperative framework. Accordingly, in the service providing apparatus, an interface for inquiring whether the image processing apparatus can use the services is not necessarily prepared. More specifically, in the conventional image processing apparatus, a user interface (UI), scan processing, and print processing are required to be mounted according to the services. If the number of services that cooperate with the image processing apparatus is increased, therefore, mounted codes become huger.

SUMMARY OF THE INVENTION

One aspect of the present invention is directed to appropriately dealing with an increase in the number of services that cooperate with an image forming apparatus.

According to another aspect of the present invention, an image forming apparatus includes a plurality of individual processing units respectively corresponding to a plurality of services that cooperate with the image forming apparatus via a network and configured to communicate with the services and perform individual processing corresponding to the services, a specifying unit configured to specify an individual processing unit corresponding to the service selected out of the plurality of services in response to a user operation, from the plurality of individual processing units, and a generation unit serving as a module commonly used among the plurality of individual processing units and configured to generate screen information corresponding to the individual processing unit specified by the specifying unit based on the information managed by the individual processing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of an initial screen.

DESCRIPTION OF THE EMBODIMENTS

Various exemplary embodiments, features, and aspects of the invention will be described in detail below with reference to the drawings.

The exemplary embodiments do not limit the present invention. All components described in the exemplary embodiments are not necessarily essential as means for solving the issue of the present invention.

Figure 1:
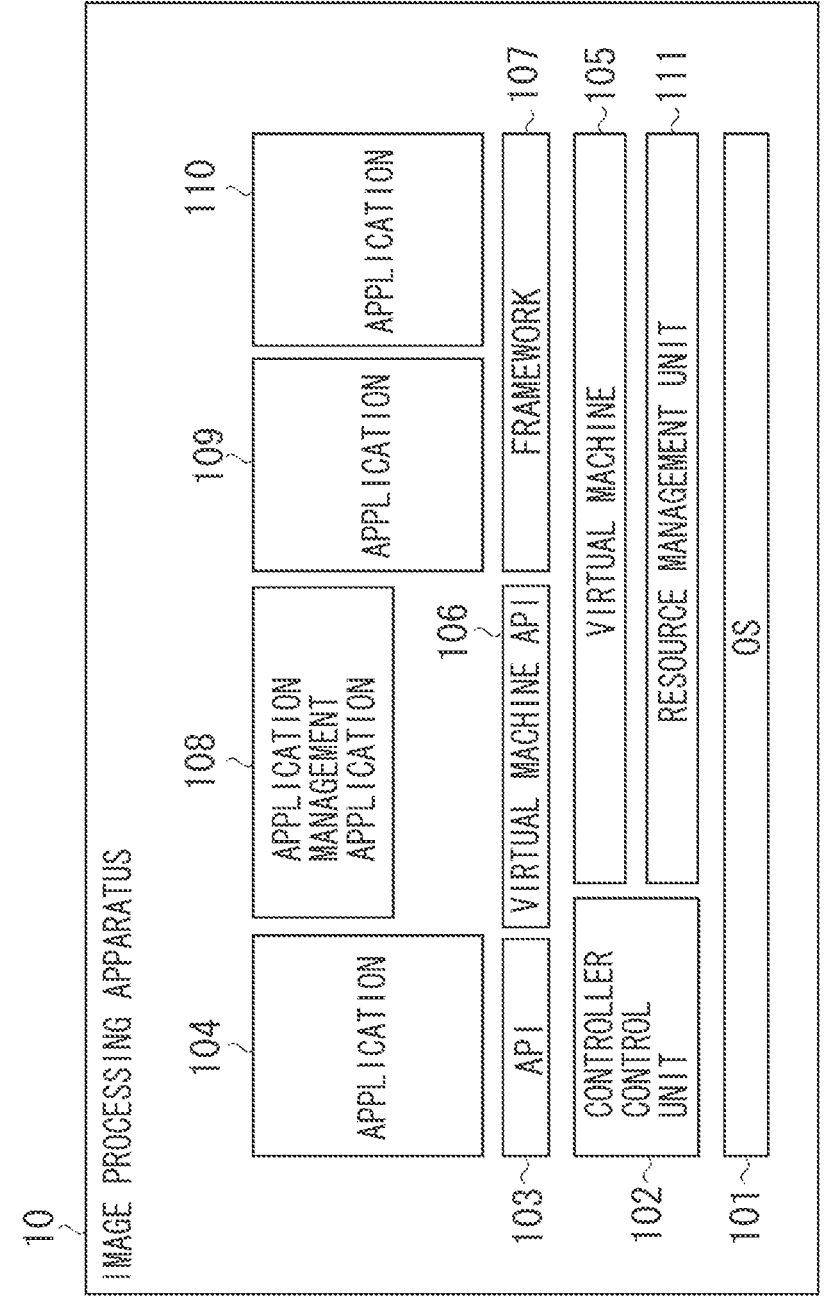
FIG. 1 illustrates an example of a basic software configuration of an image processing apparatus.

A first exemplary embodiment will be described below. FIG. 1 illustrates an example of a basic software configuration of an image processing apparatus 10. An operating system (OS) 101 is an example of a first execution environment, and controls the whole image processing apparatus 10. The OS 101 includes a library group for instructing modules (or a central processing unit (CPU)) in a real time OS for respectively controlling various functions of the image processing apparatus 10 in real time so that the library group controls various functions including an option device and an expansion card connected to the image processing apparatus 10. The OS 101 further includes a module group for providing an interface command to applications that operate in an order higher than the OS 101.

A controller control unit 102 operates on the OS 101, and includes modules for controlling a scanner 521, a printer 520, and so on, described below. An application programming interface (API) 103 is responsive to a sequence of instructions input from the applications, to access the controller control unit 102. The API 103 sends a control command to devices connected to a network via a network interface (I/F) 518, described below. An application 104 operates on the OS 101, and requests various types of processing from the controller control unit 102 via the API 103.

A virtual machine 105 is a second execution environment most suitable for executing specific applications, and is implemented by a virtual machine such as Java (registered trademark), for example. A virtual machine API 106 accesses the controller control unit 102 that operates on the OS 101 by the applications on the virtual machine 105, and has a function of a conversion module for calling the API 103 in the present exemplary embodiment.

A framework 107 is a module having a function of integrally controlling the applications on the virtual machine 105. An application management application 108 manages other applications on the virtual machine 105, cooperates with the framework 107, and downloads, uploads, deletes, and invalidates applications 109 and 110. The applications 109 and 110 operate on the virtual machine 105, and request various types of processing from the controller control unit 102 via the virtual machine API 106.

A resource management unit 111 manages resources used by the virtual machine 105, and operates on the OS 101. The resource management unit 111 sets a limit so that resources such as a memory more than previously determined cannot be used when the virtual machine 105, the virtual machine API 106, the framework 107, or all the applications on the OS 101 use the resources. For example, the resource management unit 111 performs control so that the application that displays a user interface (UI) cannot display the UIs if more than the predetermined maximum number of the UIs are displayed.

While the application is assumed to be the one (e.g., the application 109) that operates in the second execution environment, it may be an application (e.g., the application 104) that operates in the first execution environment.

A service cooperation method in which an image processing apparatus cooperates with various services (e.g., services for retaining data scanned by the image processing apparatus), to improve the efficiency of user's work in a cloud computing environment will be described.

Conventionally, when an image processing apparatus sends data representing a scanned document to an external service, data having any data format (hereinafter referred to as a file format or a data format, as needed) that can be generated by the image processing apparatus has been sent to the external service. Generally, under a network environment such as a local area network (LAN), an external server, which provides a service and is a sending destination can nearly always receive all data having a data format sent from the image processing apparatus. Since the external server is a general-purpose server that can receive binary data regardless of its data format, for example, a file transfer protocol (FTP) server, a server message block (SMB) server, and a web data valid (DAV) server, the image processing apparatus may nearly always send data having any data format.

If there exists a data format that cannot be received by the external server as the sending destination, the data format that cannot be received by the image processing apparatus is inquired for so that the type of data that can be sent from the image processing apparatus is controlled (see, e.g., Japanese Patent Application Laid-Open No. 2010-56770).

On the other hand, under the cloud computing environment in which various services are provided, a data format that can be received (stored) differs for each service. A data format that is stored differs for each service. When the image processing apparatus downloads and prints data, therefore, the data may not be printable depending on the type of data.

When data is sent from the image processing apparatus to the service in the cloud computing environment, or data is downloaded from the service and printed, the image processing apparatus is required to inquire an appropriate data format of the external server. More specifically, the image processing apparatus is required to inquire of the external server what a receivable data format is or whether data having a printable data format is retained, and to perform processing according to an inquiry result.

However, in the cloud computing environment, a provider of the external server and a provider of the image processing apparatus are not necessarily in a cooperative framework. Accordingly, an interface for the image processing apparatus to inquire of the external server is not necessarily prepared.

For such reasons, in order to enjoy the services in the cloud computing environment, a user interface, scan processing, and print processing are required to be mounted, respectively, according to the services in the image processing apparatus. Therefore, as the number of services that cooperate with the image processing apparatus increases, mounted codes become huger.

Figure 2:
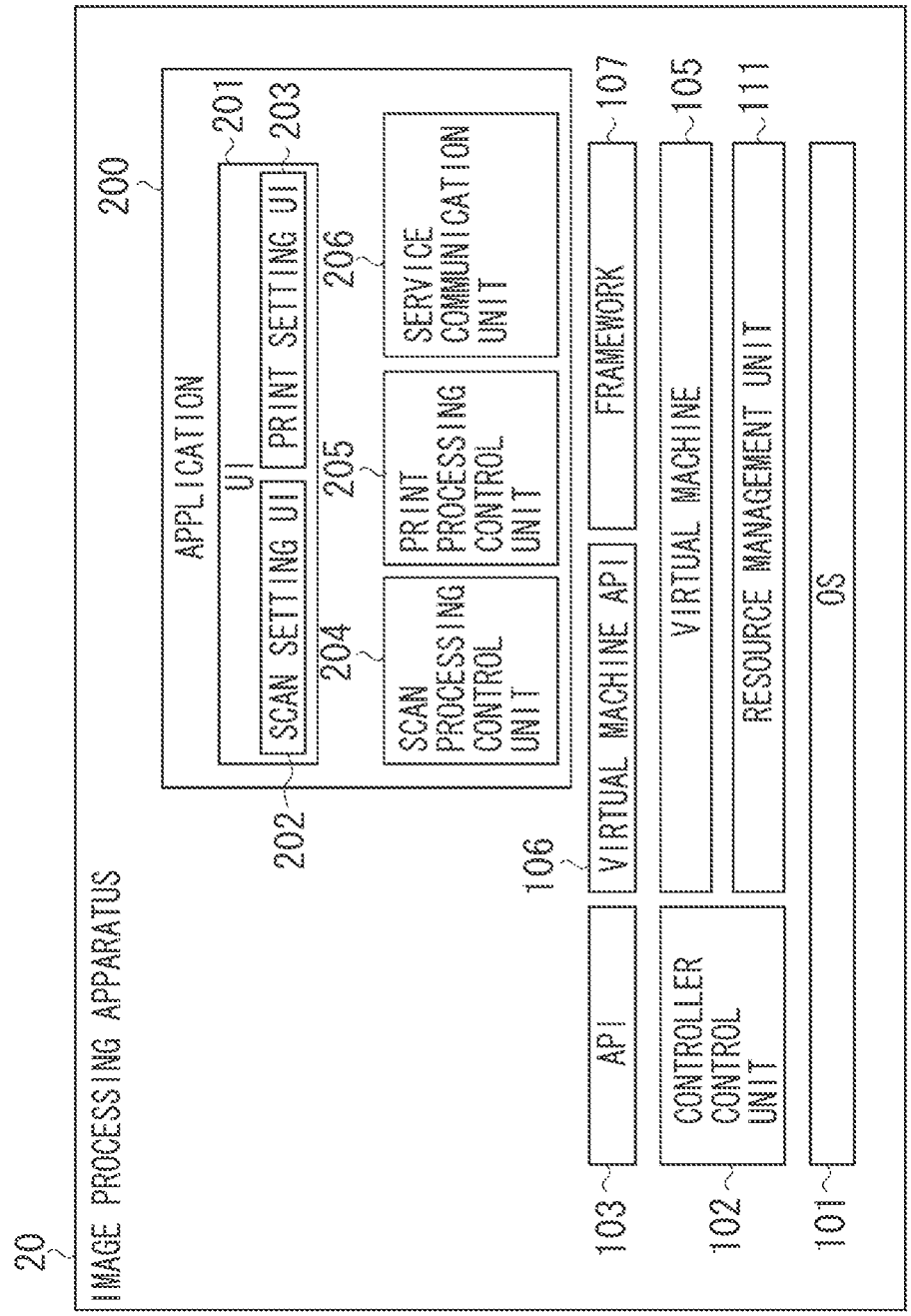
FIG. 2 illustrates an example of a functional configuration of an application.
Figure 3:
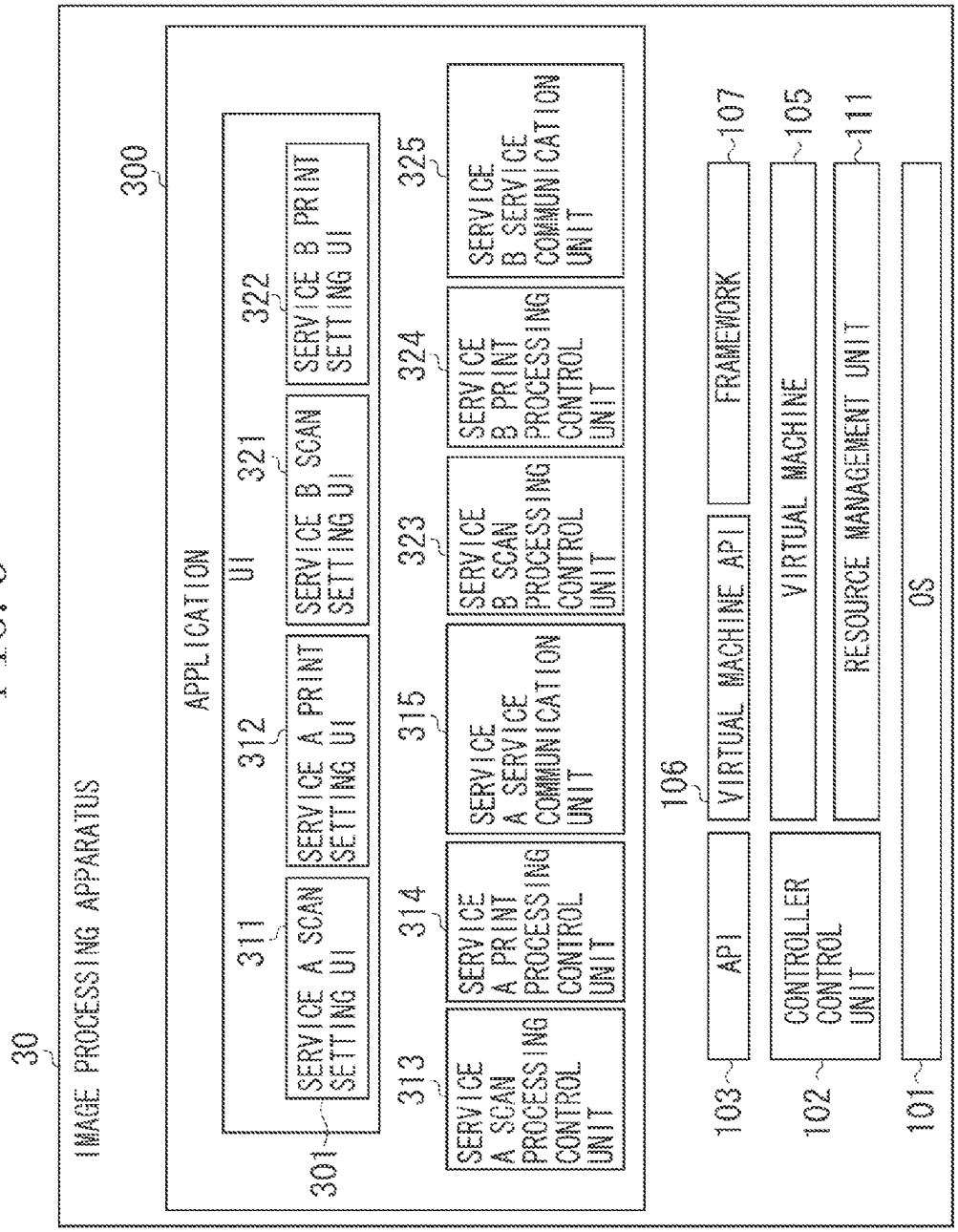
FIG. 3 illustrates an example of a functional configuration of an application.

The above-mentioned will be described below more specifically with reference to FIGS. 2 and 3. FIG. 2 illustrates an example of a functional configuration of an application 200 in an image processing apparatus 20 that sends and receives data to and from the general-purpose server under the network environment such as the LAN. The server can receive data having any data format. Therefore, the application 200 is mounted in consideration of only data that can be processed by the image processing apparatus 20.

More specifically, a scan setting UI 202 in a UI 201 displays a UI for performing setting for data that can be generated by the image processing apparatus 20. A print setting UI 203 in the UI 201 displays a UI for performing setting for acquisition of data that can be printed by the image processing apparatus 20. A scan processing control unit 204 performs processing only considering whether a setting content is consistent with a processing capability of the image processing apparatus 20 according to a setting content (setting value) in the scan setting UI 202. A print processing control unit 205 performs processing only considering whether a setting content is consistent with the processing capability of the image processing apparatus 20 according to a setting content (setting value) in the print setting UI 203. A service communication unit 206 sends and receives a file (a document) according to an FTP, an SMB, a web DAV, or the like.

An example of an image processing apparatus (an image processing apparatus 30) that sends and receives data to and from various services under the cloud computing environment will be described below. FIG. 3 illustrates an example of a functional configuration of an application 300 in the image processing apparatus 30. The application 300 needs to be mounted also in consideration of data that can be processed by a service (external server). A user interface, scan processing, and print processing are mounted for each service. The application 300 assumes that it sends and receives data to and from two services, i.e., a service A and a service B. In a UI 301, a scan setting UI 311 for a service A (service A scan setting UI) is data that can be generated by the image processing apparatus 30, and displays a UI for making setting for data that can be received in the service A. Similarly, a print setting UI 312 for a service A (service A print setting UI) is data that can be stored in the service A, and displays a UI for making setting for acquisition of data that can be printed by the image processing apparatus 30.

A scan processing control unit 313 for a service A (service A scan processing control unit) performs processing considering whether a setting content is consistent with not only a processing capability of the image processing apparatus 30 but also a data storage capability in the service A according to a setting content in the service A scan setting UI 311. A print processing control unit 314 for a service A (service A print processing control unit) performs processing considering whether a setting content is consistent with not only the processing capability of the image processing apparatus 30 but also a data storage capability in the service A according to a setting content in the service A scan setting UI 312. A service communication unit for a service A (service A service communication unit) 315 sends and receives a file according to a communication protocol and a communication interface that are provided by the service A.

Similarly, a scan setting UI 321 for a service B (service B scan setting UI), a print setting UI 322 for a service B (service B print setting UI), a scan processing control unit 323 for a service B (service B scan processing control unit), a print processing control unit 324 for a service B (service B print processing control unit), and a service communication unit 325 for a service B (service B service communication unit) are required to be mounted in consideration of data that can be processed by the service B.

Therefore, as the number of services for sending and receiving data to and from the image processing apparatus 30 increases, a mounting code becomes huger.

An image processing apparatus, which differs from the image processing apparatus 30 and is capable of performing display of a UI, scan processing, and print processing according to the services, will be described below.

Figure 4:
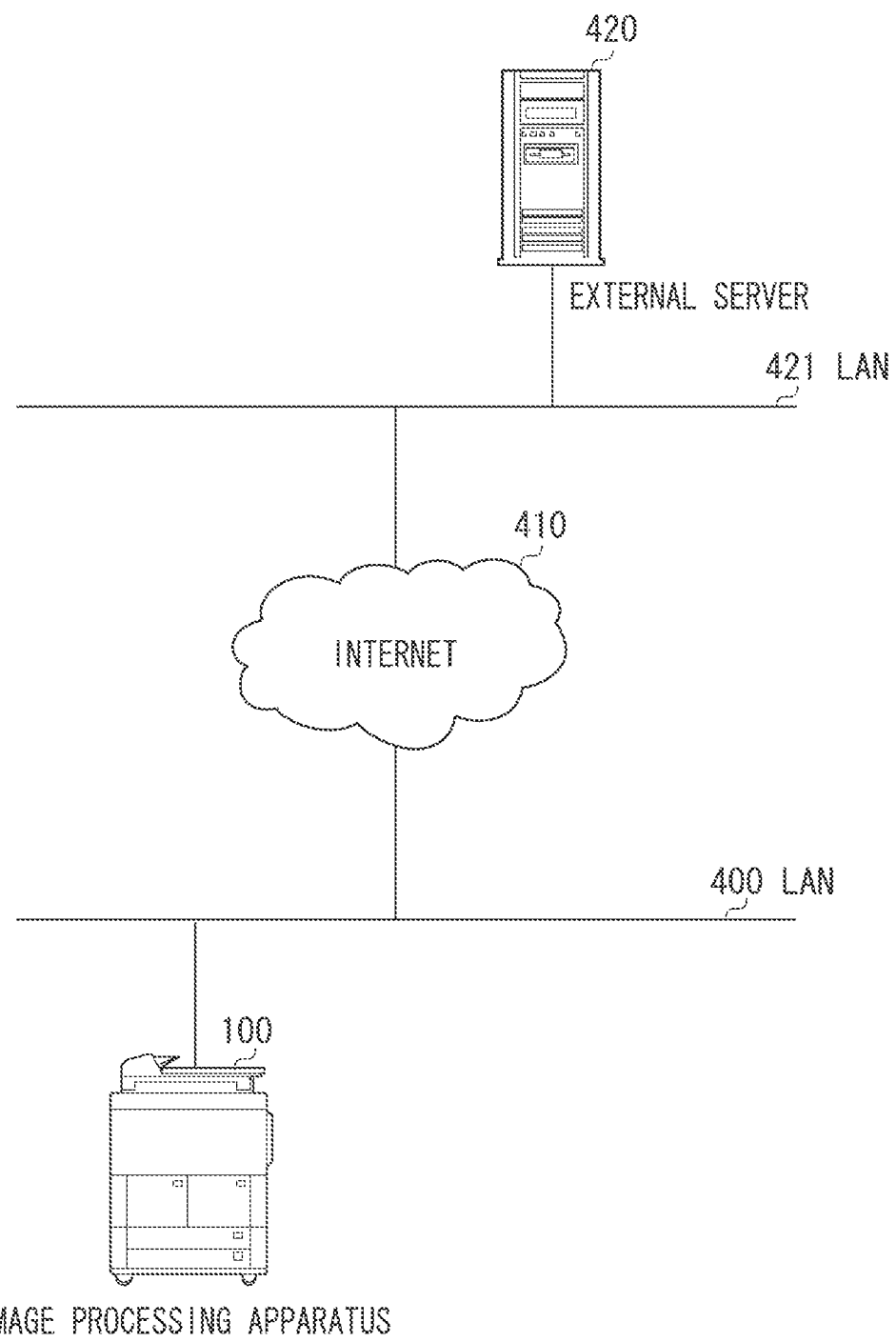
FIG. 4 illustrates an example of a configuration of an image processing system.

FIG. 4 illustrates an example of a configuration of an image processing system according to the present exemplary embodiment. The image processing apparatus 100 which is an example of a computer is an image forming apparatus such as a printer or a multifunction peripheral (MFP), and is connected to the Internet 410 via a LAN 400. An external server 420 is an example of a computer, is connected to the Internet 410 via a LAN 421, and provides a service in the cloud computing environment. Accordingly, the image processing apparatus 100 can communicate with the external server 420, and can cooperate with a service (e.g., a file management service) provided by the external server 420.

While the external server 420 includes one external server, and the one external server provides the file management service in the present embodiment, the external server 420 may include a plurality of servers as its other format, and the plurality of servers may start a plurality of virtual machines to perform distributed processing. In this case, a technique referred to as a "scale out" (a cloud computing technique) for increasing the number of virtual machines according to a predetermined condition is used.

Figure 5:
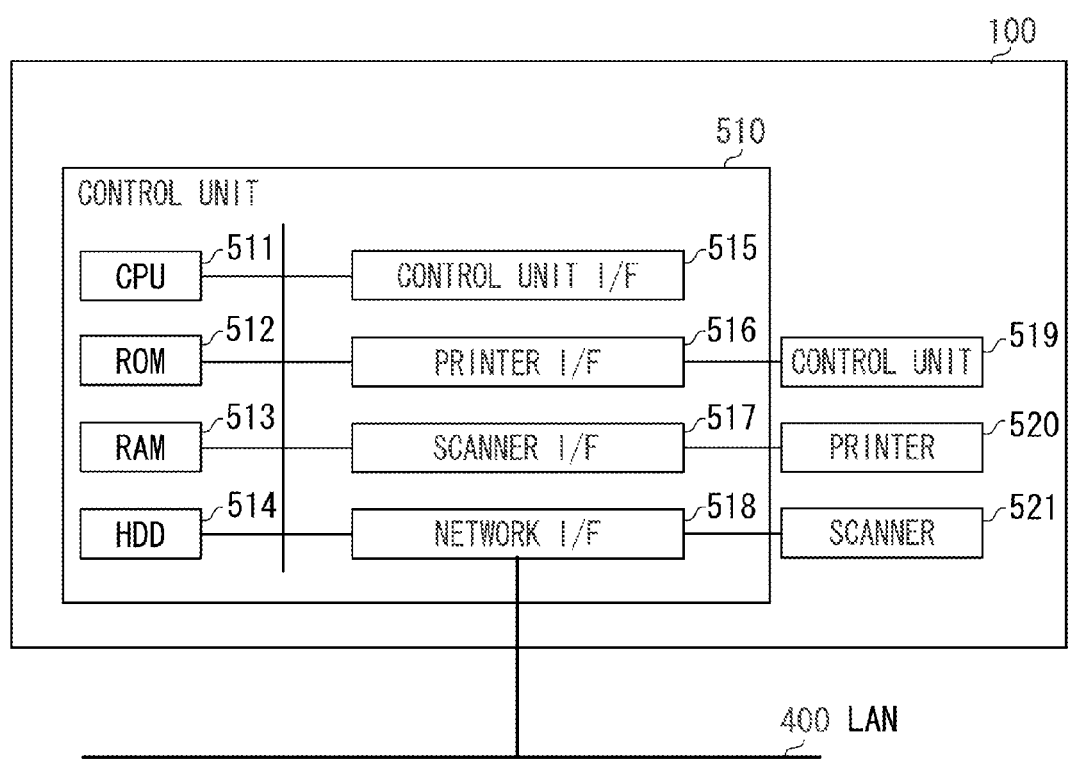
FIG. 5 illustrates an example of a hardware configuration of an image processing apparatus.

FIG. 5 illustrates an example of a hardware configuration of the image processing apparatus 100. A control unit 510 controls an overall operation of the image processing apparatus 100. A CPU 511 reads out a control program stored in a read-only memory (ROM) 512, to perform various types of control such as reading control and sending control. The control program is executed so that functions of the controller control unit 102 or the like are implemented. A random access memory (RAM) 513 is used as a temporary storage area such as a main memory or a work area in the CPU 511.

A hard disk drive (HDD) 514 stores image data, various programs, and various tables. An operation unit I/F 515 connects an operation unit 519 and the control unit 510. The operation unit 519 includes a liquid crystal display unit having a touch panel function, a keyboard, and so on. An application in the image processing apparatus 100 calls the virtual machine API 106 (or the API 103) according to processing, and requests the controller control unit 102 to execute processing for displaying various screens on the liquid crystal display unit in the operation unit 519.

A printer I/F 516 connects the printer 520 and the control unit 510. Data (e.g., image data) to be printed by the printer 520 is transferred from the control unit 510 via the printer I/F 516, and is printed on a recording medium in the printer 520. The application in the image processing apparatus 100 calls the virtual machine API 106 (or the API 103) according to processing, and requests the controller control unit 102 to execute print processing.

A scanner I/F 517 connects the scanner 521 and the control unit 510. The scanner 521 reads a document to generate image data, and inputs the image data to the control unit 510 via the scanner I/F 517. The application in the image processing apparatus 100 calls the virtual machine API 106 (or the API 103) according to processing. The application in the image processing apparatus 100 requests the controller control unit 102 to execute scan processing, and sends image data (scan data, described below) to the external server 420.

The network I/F 518 connects the control unit 510 (the image processing apparatus 100) to the LAN 400. The network I/F 518 sends various types of information to the external server 420 connected via the LAN 400, and receives the various types of information from the external server 420 connected via the LAN 400.

Figure 6:
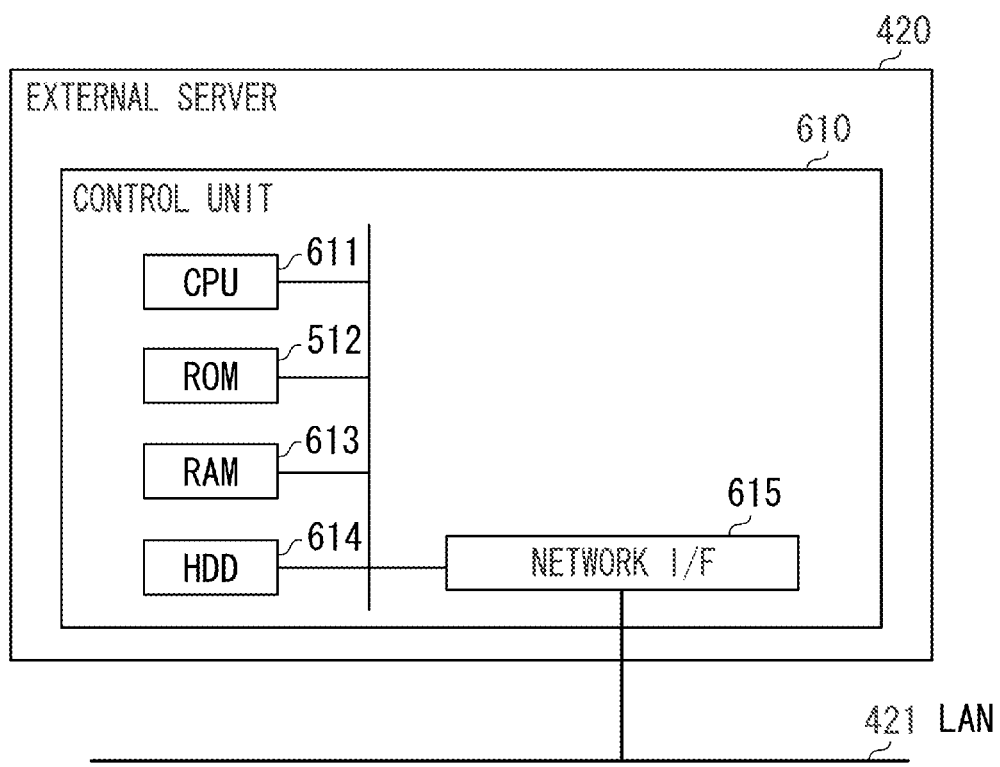
FIG. 6 illustrates an example of a hardware configuration of an external server.

FIG. 6 illustrates an example of a hardware configuration of the external server 420. A control unit 610 controls an overall operation of the external server 420. A CPU 611 reads out a control program stored in a ROM 612, to perform various types of control processing. A RAM 613 is used as a temporary storage area such as a main memory or a work area in the CPU 611. A HDD 614 stores image data, various types of programs, and various types of information. A network I/F 615 connects the control unit 610 (the external server 420) to the LAN 421. The network I/F 615 sends and receives various types of information to and from another apparatus connected via the LAN 421.

In the present exemplary embodiment, the CPU 611 performs processing according to a procedure for the control program stored in the ROM 612, to implement functions in the external server 420 and various types of processing, described below.

Figure 7:
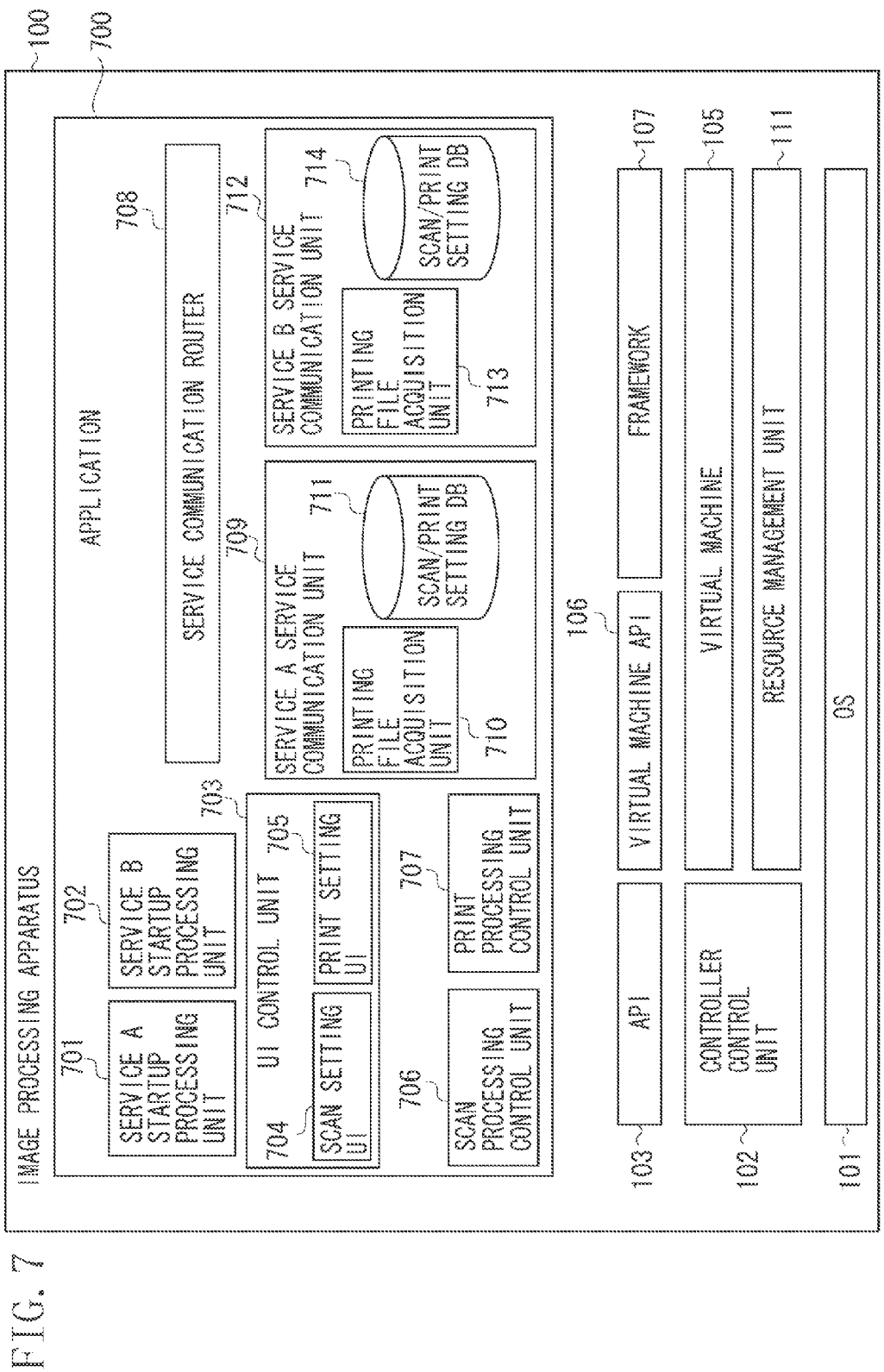
FIG. 7 illustrates an example of a functional configuration of an application.

FIG. 7 illustrates an example of a functional configuration of an application 700. Functional units illustrated in FIG. 7 are implemented when the CPU 511 in the image processing apparatus 100 executes a control program. Similar constituent elements to those illustrated in FIG. 1 are assigned the same reference numerals, and hence the description thereof is not repeated.

In the present exemplary embodiment, it is assumed that the application 700 operates on the virtual machine 105, similarly to the applications 109 and 110. The application 700 may operate on the OS 101, similarly to the application 104.

A startup processing unit 701 for a service A (service A startup processing unit) performs initialization processing for performing processing for a service A by an instruction from the virtual machine 105. The service A startup processing unit 701 sends to a service communication router 708 a specifying request to specify a service communication unit for a service A (service A service communication unit 709) as the initialization processing. The service A startup processing unit 701 requests the service A service communication unit 709 specified by the service communication router 708 to acquire screen generation information (e.g., initial screen display data) from the service A. The service A startup processing unit 701 includes the initial screen display data in a request to display an initial screen when it ends the initialization processing, and sends the initial screen display request to a UI control unit 703. A startup processing unit 702 for a service B (service B startup processing unit) performs initialization processing for performing processing for a service B, similarly to the service A startup processing unit 701. While the image processing apparatus 100 acquires screen generation information from the service to display a screen, and generates a screen (i.e., screen information provided to generate the screen) based on the acquired screen generation information in the present embodiment, the present invention is not limited to this. The image processing apparatus 100 may generate a screen based on the screen generation information in the image processing apparatus 100 without acquiring the screen generation information from the service, and may display another screen generated based on the screen generation information in the image processing apparatus 100 as an initial screen.

The UI control unit 703 includes a scan setting UI 704 and a print setting UI 705. The UI control unit 703 performs processing for displaying a UI on the operation unit 519. More specifically, the UI control unit 703 receives the initial screen display request from the service A startup processing unit 701 or the service B startup processing unit 702, and displays an initial screen illustrated in FIG. 8, for example. The UI control unit 703 sends to the service communication router 708 an acquisition request to acquire scan setting information relating to scanning, and sends to the scan setting UI 704 the scan setting information received from the service communication router 708. Similarly, the UI control unit 703 sends to the service communication router 708 an acquisition request to acquire print setting information relating to printing, and sends to the print setting UI 705 the print setting information received from the service communication router 708. The scan setting UI 704 generates screen information relating to a scan setting screen illustrated in FIG. 9, for example, according to the scan setting information received from the UI control unit 703, to display the scan setting screen on the operation unit 519. The scan setting unit UI 704 sends to a scan processing control unit 706 an input value input by the user in timing at which a scan start button for the scan setting screen is pressed.

The print setting UI 705 generates screen information relating to an initial screen 800 illustrated in FIG. 8, for example, according to the print setting information received from the UI control unit 703, displays the initial screen 800 on the operation unit 519, and controls an operation in the initial screen 800. The print setting UI 705 performs control so that the user cannot give an instruction to print a file that cannot be printed in a list of file names/folder names (file name/folder name list) 801.

More specifically, when the file that cannot be printed is selected in the list 801 according to a user's operation, a print button 803 is brought into a disable state so that it cannot be pressed. On the other hand, when the print button 803 is pressed, the print setting UI 705 sends to a print processing control unit 707 a file name of the file (which may be a file identifier) selected in the list 801 and a request to print the file.

The scan processing control unit 706 receives a value input on a scan setting screen and sent from the scan setting UI 704, to execute scan processing, and acquires image data from a scan processing result. The scan processing control unit 706 converts image data into scan data having a file format that can be processed by the service A according to the input value, and sends to the service communication router 708 the scan data and a request to send the scan data to the service A.

The print processing control unit 707 receives the file name and the printing request, which are sent from the print setting UI 705, to send the file name and a request to acquire the file to the service communication router 708. The print processing control unit 707 receives a response to the file acquisition request from the service communication router 708 and a file acquisition result, to execute print processing.

The service communication router 708 specifies, when it receives a service communication unit specifying request from the service A startup processing unit 701 or the service B startup processing unit 702, a service communication unit suitable for communication with each of the services. The service communication router 708 is responsive to an acquisition request from the UI control unit 703, to acquire scan setting information or print setting information via the specified service communication unit and send the acquired setting information to the UI control unit 703.

The service communication router 708 sends, when it receives the scan data and the scan data sending request from the scan processing control unit 706, the scan data and the scan data sending request to the specified service communication unit. The service communication router 708 sends, when it receives the file name and the printing request from the print processing control unit 707, the file name and the printing request to the specified service communication unit.

The service A service communication unit 709 mainly performs processing for communication with the service A. The service A service communication unit 709 acquires scan setting information or print setting information from a scan/print setting database (scan/print setting DB) 711 in response to the acquisition request from the service communication router 708, and sends the acquired setting information to the service communication router 708. The service A service communication unit 709 sends, based on the scan data and the scan data sending request, which have been received from the service communication router 708, the received scan data to the service A. The service A service communication unit 709 calls the printing file acquisition unit 710 based on the file name and the printing request, which have been received from the service communication router 708. In other words, the service communication unit is an example of an individual processing unit, and communicates with each of the services while performing individual processing for the service.

It is assumed that the service A service communication unit 709 controls communication processing in an application layer that differs for each service. For example, it is assumed that the service A service communication unit 709 performs communication with a service by a web service such as Single Object Access Protocol (SOAP) or REpresentational State Transfer (REST) implemented by using a HyperText Transfer Protocol (HTTP) which is a communication protocol.

A printing file acquisition unit 710 acquires a printing file from the service A based on the file name in response to a call from the service A service communication unit 709. At this time, the printing file acquisition unit 710 determines whether the image processing apparatus 100 can perform printing depending on the file name. If it is determined that even a file having an unprintable file format can be converted into a file having a printable file format in the service A, the service A service communication unit 709 requests the service A to convert the file into a printable file. In this case, the printing file acquisition unit 710 acquires the file after the conversion from the service A.

The scan/print setting DB 711 manages information such as a file format of scan data that can be sent to the service A, an item in which setting relating to scan processing can be made, and a file, which can be printed by the image processing apparatus 100, acquired from the service A (data to be printed).

A service communication unit 712 for a service B (service B service communication unit) basically performs processing similarly to the service A service communication unit 709. A communication partner with which the service B service communication unit 712 communicates is the service B. A printing file acquisition unit 713 and a scan/print setting DB 714 are also basically similar to the printing file acquisition unit 710 and the scan/print setting DB 711. However, a service to be processed by the printing file acquisition unit 713 and the scan/print setting DB 714 is the service B.

FIG. 8 illustrates an example of an initial screen obtained when the service A is accessed. The initial screen is displayed on the operation unit 519 when the CPU 511 in the image processing apparatus 100 executes a control program. While an example of the initial screen obtained when the service A is accessed is illustrated in FIG. 8, an initial screen obtained when the service B is accessed is a similar screen.

The initial screen 800 is an example of an initial screen obtained when the service A is accessed, and is displayed by the UI control unit 703 after the service A startup processing unit 701 in the application 700 ends initialization processing. The file name/folder name list 801 represents names of files and names of folders, which are stored (managed) in the service A. FIG. 8 illustrates a state where the UI control unit 703 displays the initial screen display data acquired by the service A startup processing unit 701 on the operation unit 519.

If the user desires to send scanned image data to the service A, the user operates the liquid crystal display unit having a touch panel function (performs a user operation), to designate any folder in the file name/folder name list 801, and presses a sending button 802. When the user operation for pressing the sending button 802 is performed, a scan setting screen 900 illustrated in FIG. 9, for example, is displayed on the operation unit 519.

When the user desires to print files stored in the service A, the user designates any of the files in the file name/folder name list 801, and presses the print button 803. When the user presses the print button 803, the application 700 acquires the designated file from the service A and prints the acquired file.

When the user presses a cancel button 804, the image processing apparatus 100 displays a menu screen of the image processing apparatus 100 on the operation unit 519. On the menu screen, the user can designate, out of basic functions of the image processing apparatus 100 such as copying and scanning and functions such as access to the service A and access to the service B, the function that the user desires to use.

Figure 9:
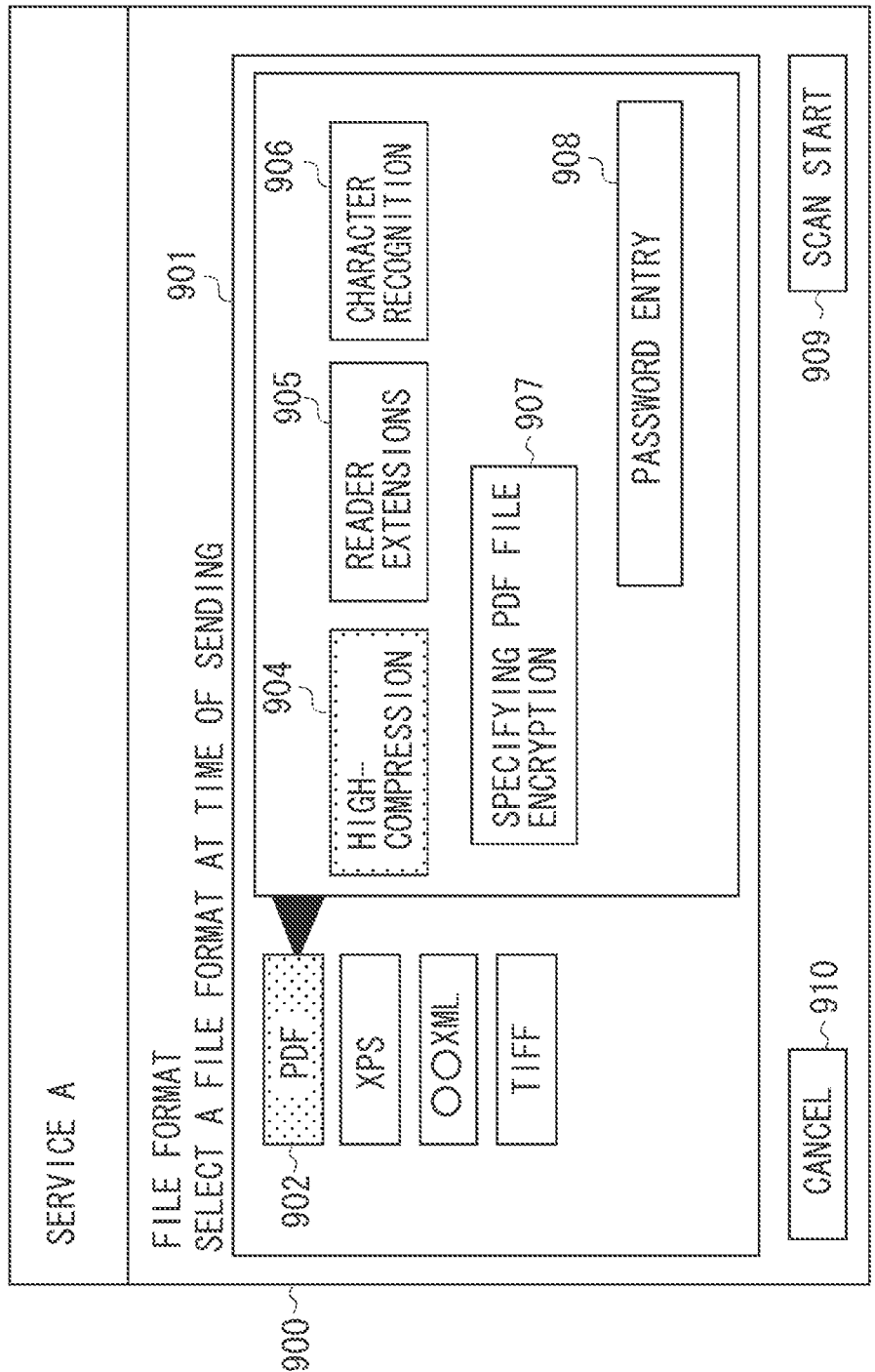
FIG. 9 illustrates an example of a scan setting screen.

FIG. 9 illustrates an example of a scan setting screen 900 obtained when the service A is accessed. The scan setting screen 900 is displayed on the operation unit 519 when the CPU 511 in the image processing apparatus 100 executes a control program. While an example of the scan setting screen 900 obtained when the service A is accessed is illustrated in FIG. 9, a screen obtained when the service B is accessed is similar thereto. However, in the service B, all selection items illustrated in FIG. 9 are not necessarily displayed. In the service B, data having a data format different from that in the service A may be processed.

The scan setting screen 900 receives a designation of a file format of a file into which image data generated by scanning a document is converted. When the user operation for pressing the sending button 802 on the initial screen 800 is performed, the application 700 displays the screen 900 on the operation unit 519.

A file format selection setting 901 switches display of a detailed setting 903 in response to pressing of a file format button (e.g., a Portable Document Format (PDF) button 902) for selecting a file format displayed at the left thereof. FIG. 9 illustrates a state where the PDF file format button 902 is pressed.

The detailed setting 903 includes setting items that can be set for scan processing for each file format selected by pressing the file format button. In the present exemplary embodiment, the setting items in the detailed setting 903 in a state where the PDF file format button 902 is selected are illustrated. A high-compression specifying button 904 is a bottom for designating whether a PDF file having a high-compression format is generated when the PDF file is generated. FIG. 9 illustrates a state where the high-compression specifying button 904 is pressed, to make a setting, "Generate a PDF file having a high-compression format".

A reader extensions specifying button 905 is a button for designating whether a PDF file having a reader extension format is generated when the PDF file is generated. An optical character recognition (OCR) specifying button 906 is a button for executing OCR processing for image data obtained by scanning a document and designating whether an execution result is embedded in the PDF file.

A PDF file encryption specifying button 907 is a button for specifying, when the PDF file is generated, whether to prevent opening of the PDF file unless a password is entered when opened. A password entry area 908 is an entry area for entering the password when the PDF file is opened. The password entry area 908 allows entry of the password only when the PDF file encryption specifying button 907 is pressed.

When a user operation for selecting a file format on the scan setting screen 900 is performed, and a user operation for pressing a scan start button 909 is performed, the application 700 executes scan processing. When a user operation for pressing a cancel button 910 is performed, the application 700 makes a screen transition from the scan setting screen 900 to the initial screen 800.

Figure 10:
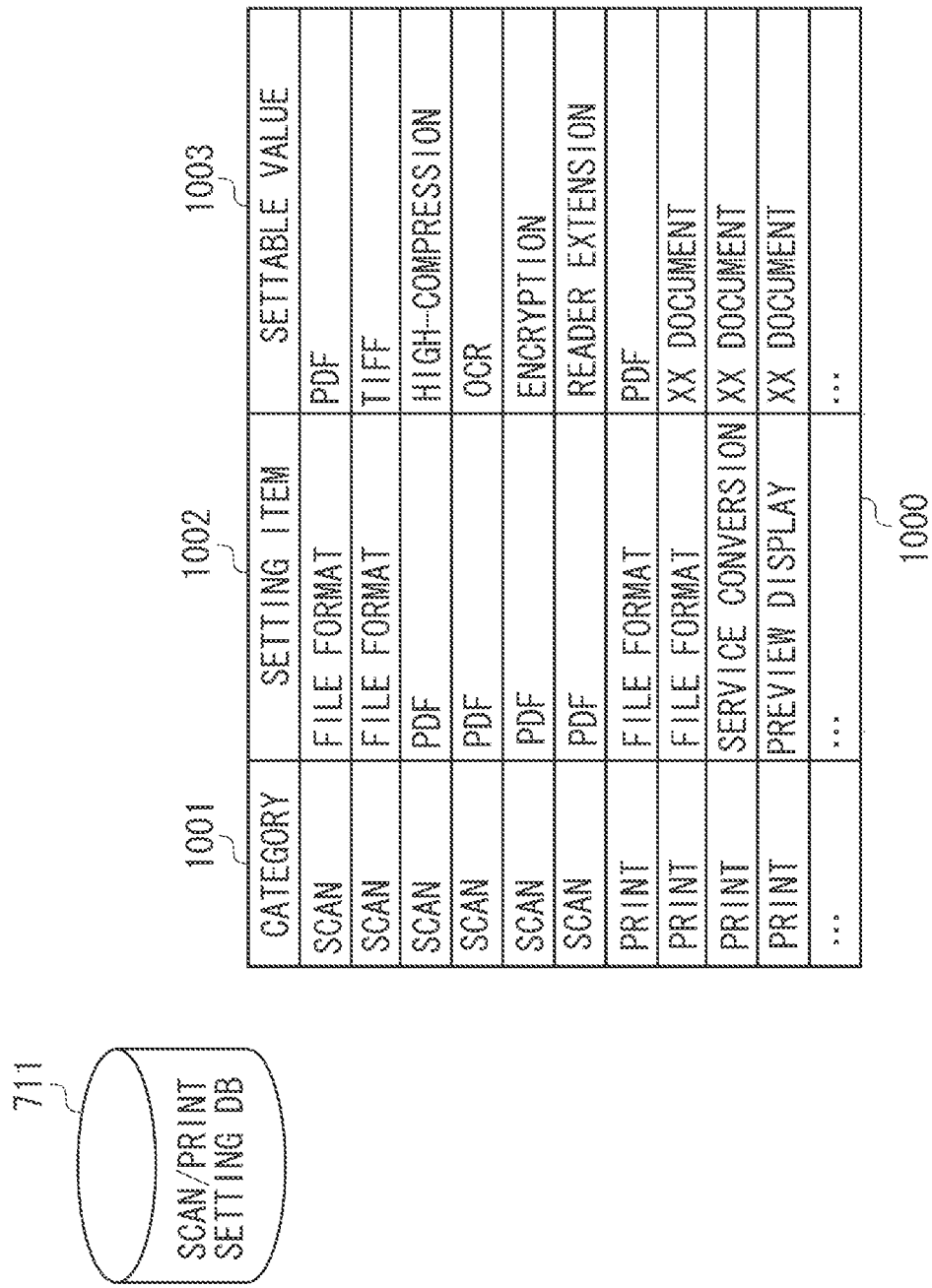
FIG. 10 illustrates an example of a configuration of a scan/print setting database DB.

FIG. 10 illustrates an example of a configuration of the scan/print setting DB 711. The scan/print setting DB 711 is stored in a storage device such as the ROM 512, the RAM 513, or the HDD 514 in the image processing apparatus 100.

Scan/print setting information 1000 is an example of information stored in the scan/print setting DB 711, and includes a category 1001, a setting item 1002, and a settable value 1003. The category 1001 represents the type of setting relating to processing (e.g., setting relating to scanning and setting relating to printing). The setting item 1002 includes items such as a file format (e.g., a file format in which data can be sent and a file format in which data can be printed), service conversion, and preview display. While in the present exemplary embodiment, the setting items include a file format in which data can be sent and a file format in which data can be printed, the present exemplary embodiment can also handle other setting items. The information relates to data that can be processed by a service to be used. The settable value 1003 represents a value used in the setting item 1002.

Figure 11:
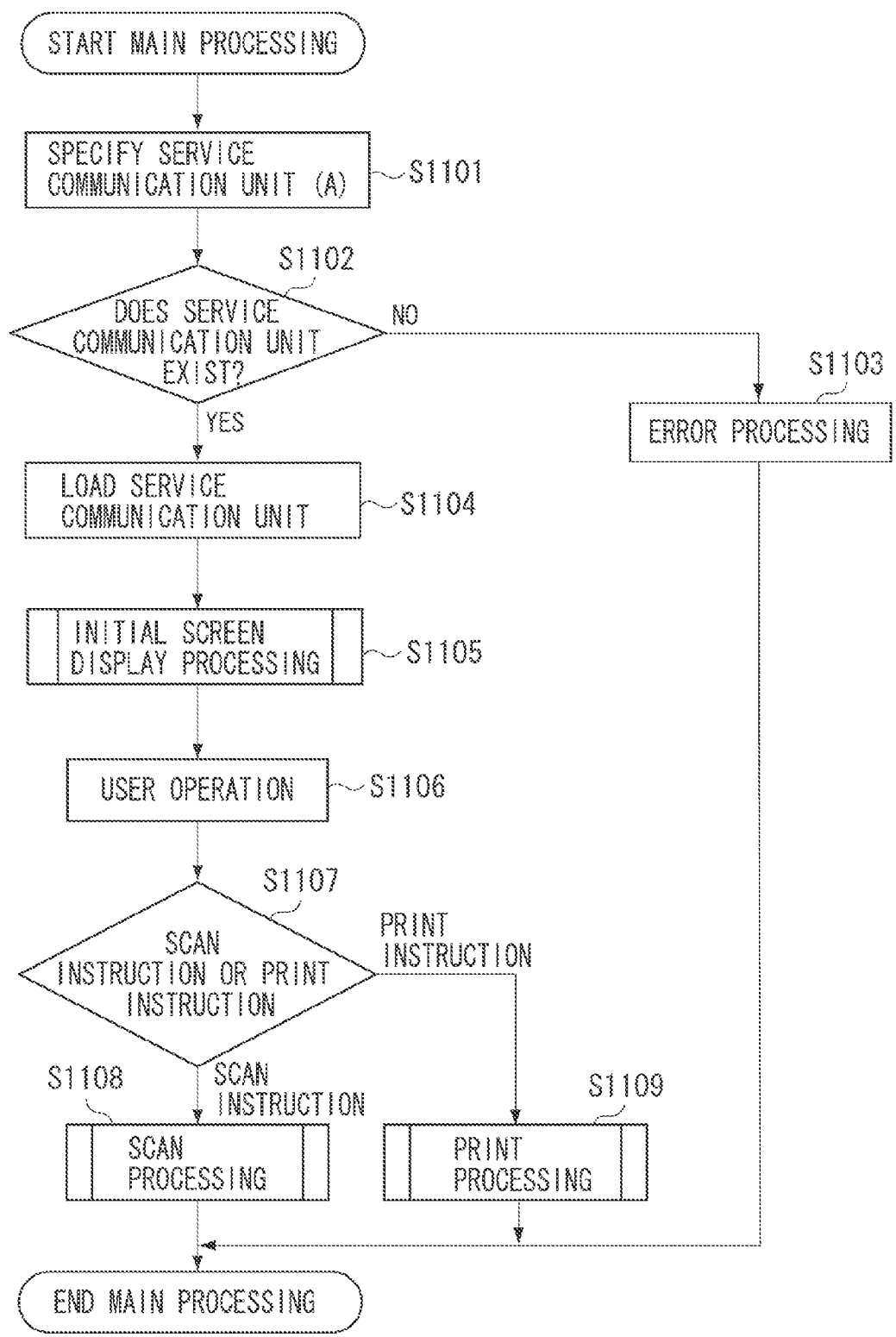
FIG. 11 illustrates an example of a flowchart relating to main processing.

FIG. 11 illustrates a flowchart relating to main processing in the application 700. Operations (steps) illustrated in the flowchart of FIG. 11 are implemented when the CPU 511 in the image processing apparatus 100 executes a control program stored in the HDD 514. The main processing is started when the image processing apparatus 100 (the virtual machine 105) executes startup processing in response to a user operation (inputting of a value) for designating a service on a menu screen of the image processing apparatus 100.

While the service A startup processing unit 701 is executed as an example, the service B startup processing unit 702 different from the service A startup processing unit 701 may be executed depending on the input value on the menu screen.

In step S1101, the CPU 511 causes the service A startup processing unit 701 to first send a specifying request to specify a service communication unit to the service communication router 708. The service communication router 708, which has received the service communication unit specifying request, specifies the service communication unit corresponding to the service A startup processing unit 701, which has sent the service communication unit specifying request. The service communication router 708 specifies the service A service communication unit 709 provided as the service communication unit corresponding to the service A startup communication unit 701.

In step S1102, the CPU 511 causes the service communication router 708 to check whether the service A service communication unit 709 exists. If the service communication router 708 determines that the service A service communication unit 709 does not exist as a result of the check (NO in step S1102), the processing proceeds to step S1103. On the other hand, if the service communication router 708 determines that the service A service communication unit 709 exists (YES in step S1102), the processing proceeds to step S1104. The service communication router 708 can check the presence or absence of the service communication unit 709 using an appropriate method. For example, the service communication router 708 refers to a file, in which a service communication unit is described, provided in the image processing apparatus 100, to check the presence or absence of the service communication unit.

In step S1103, the CPU 511 causes the service communication router 708 to return a message that the service A service communication unit 709 does not exist as a response to a specifying request (a specifying request response) to the service A startup processing unit 701. The service A startup processing unit 701, which has received the specifying request response, sends a display request to display an error message that a designated service cannot be accessed, to the UI control unit 703, and ends the processing.

In step S1104, the CPU 511 causes the service communication router 708 to load the service A service communication unit 709 and to bring the service A service communication unit 709 into a call ready state. The service communication router 708 returns a message that preparation of communication with the service A is completed as a response to a specifying request (a specifying request response), to the service A startup processing unit 701.

In step S1105, the CPU 511 causes the application 700 to perform initial screen display processing, to display the initial screen 800, for example, on the operation unit 519. Details of the initial screen display processing will be described with reference to FIG. 12.

In step S1106, the CPU 511 causes the print setting UI 705 to receive a user operation (user instruction) on the initial screen 800, for example, displayed on the operation unit 519. When the user desires to send scanned image data, the user designates a folder of a storage destination from the file name/folder name list 801 and presses the sending button 802. When the user desires to print files stored in the service A, the user designates the file to be printed from the file name/folder name list 801 and presses the print button 803.

In step S1107, the UI control unit 703 determines whether the user operation received in step S1106 is a scan instruction or a print instruction. The UI control unit 703 determines, if the pressed button is the sending button 802 on the initial screen 800, for example, that the user operation is the scan instruction. The UI control unit 703 determines, if the pressed button is the print button 803 on the initial screen 800, for example, that the user operation is the print instruction. If it is determined that the user operation is the scan instruction, the processing proceeds to step S1108. If it is determined that the user operation is the print instruction, the processing proceeds to step S1109.

In step S1108, the CPU 511 causes the application 700 to perform scan processing. Details of the scan processing will be described with reference to FIG. 13. In step S1109, the CPU 511 causes the application 700 to perform print processing. Details of the print processing will be described with reference to FIG. 14.

Figure 12:
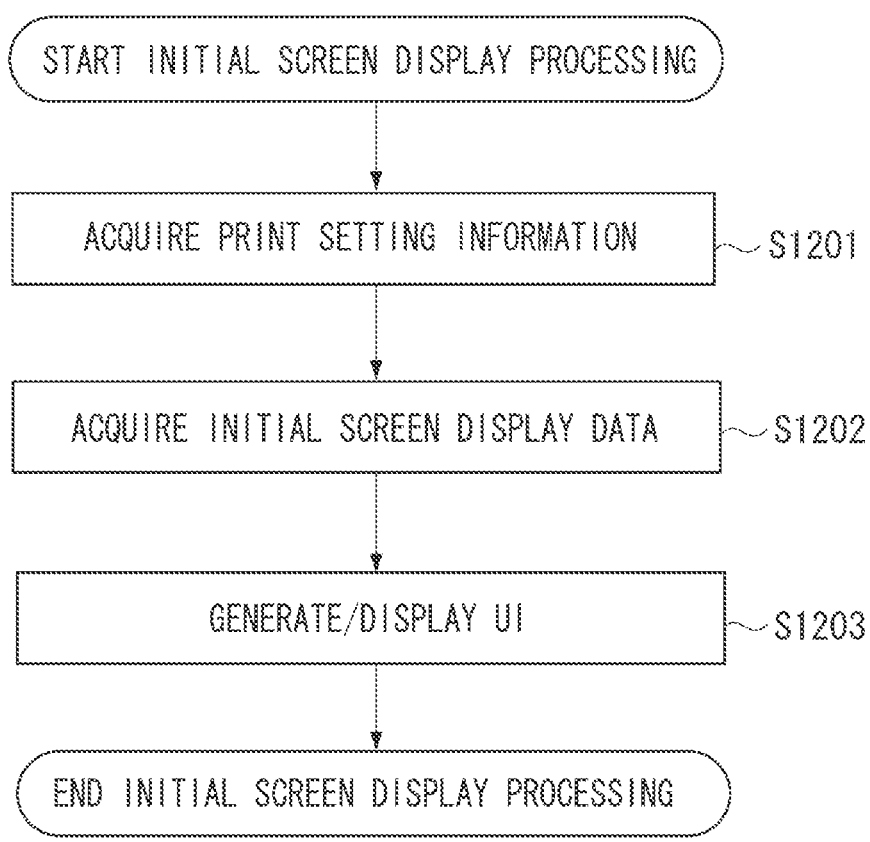
FIG. 12 illustrates an example of a flowchart relating to initial screen display processing.

FIG. 12 illustrates an example of a flowchart relating to the initial screen display processing. Each of operations (steps) illustrated in the flowchart of FIG. 12 is implemented when the CPU 511 in the image processing apparatus 100 executes the control program stored in the HDD 514.

In step S1201, the CPU 511 causes the service A startup processing unit 701 to send a request to acquire print setting information to the service communication router 708. The service communication router 708 sends the received acquisition request to the service A service communication unit 709. The service A service communication unit 709 acquires the print setting information from the scan/print setting DB 711 according to the received acquisition request. The service A service communication unit 709 returns the print setting information to the service communication router 708 as a response to the acquisition request. The service communication router 708 returns the print setting information to the service A startup processing unit 701 as a response to the acquisition request.

In step S1202, the service A startup processing unit 701 sends a request to acquire initial screen display data to the service communication router 708. The service communication router 708 sends the received acquisition request to the service A service communication unit 709. The service A service communication unit 709 communicates with the service A according to the received acquisition request, to acquire the initial screen display data. The service A service communication unit 709 returns the initial screen display data as a response to the acquisition request to the service communication router 708. The service communication router 708 returns the initial screen display data as a response to the acquisition request to the service A startup processing unit

701. The initial screen display data includes information relating to a file and information relating to a folder, which are managed in the service A.

In step S1203, the CPU 511 causes the service A startup processing unit 701, which has received the initial screen display data and the print setting information, to send a request to display an initial screen, together with the initial screen display data and the print setting information, to the UI control unit 703. The UI control unit 703 requests the print setting UI 705 to generate and display a UI when it receives the display request. The print setting UI 705 refers to the initial screen display data included in the display request, to generate the UI and display the initial screen 800, for example, on the operation unit 519, and ends the processing.

The print setting UI 705 performs control so that the print button 803 cannot be depressed when a user designates a file having a file format other than a printable file format on the file name/folder name list 801. More specifically, the print setting UI 705 specifies the printable file format from the print setting information included in the initial screen display request. More specifically, the print setting UI 705 generates information representing a screen on which the printable data out of the data that is managed in the service can be selected as a printing object. The print setting UI 705 performs control to bring the print button 803 into a disable state when the file having a file format other than the printable file format is selected on the file name/folder name list 801.

Figure 13:
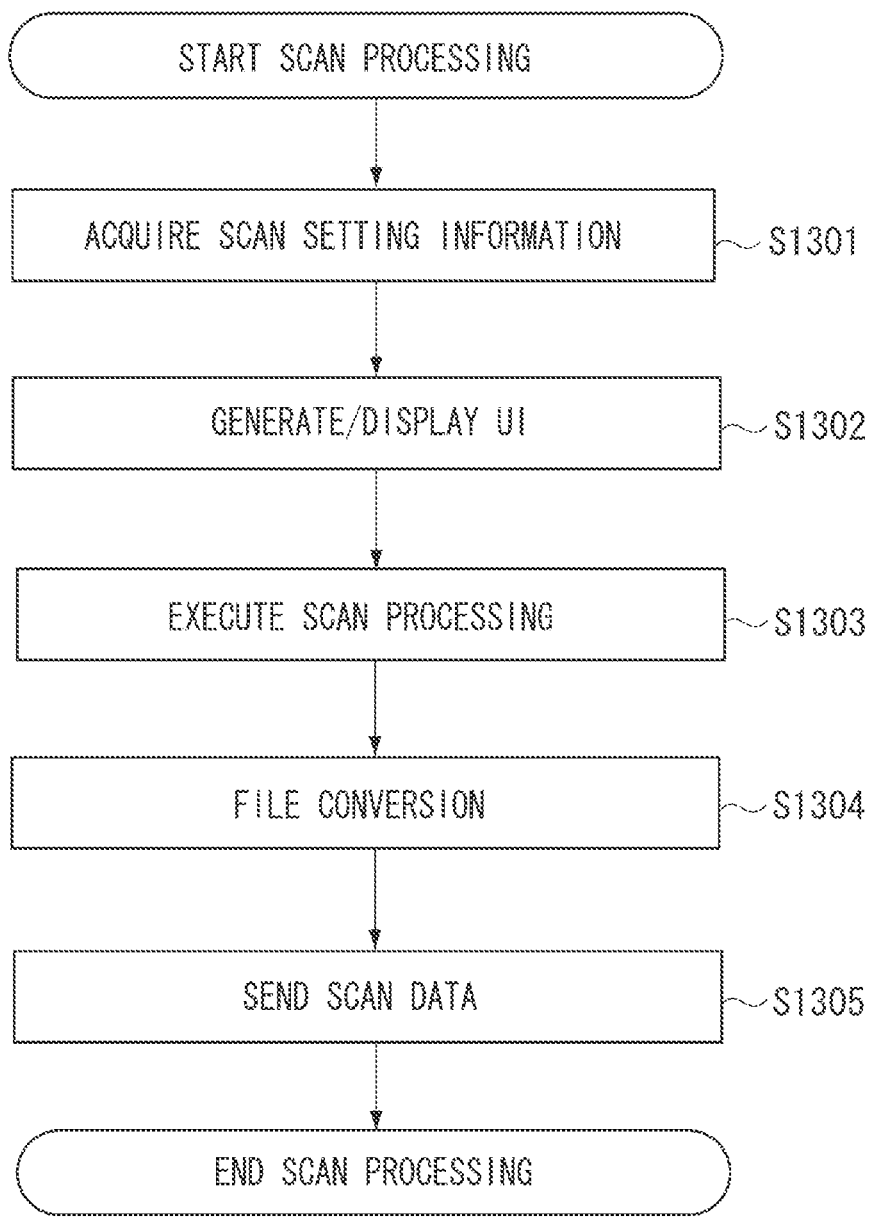
FIG. 13 illustrates an example of a flowchart relating to scan processing.

FIG. 13 illustrates an example of a flowchart relating to scan processing. Operations (steps) in the flowchart illustrated in FIG. 13 are implemented when the CPU 511 in the image processing apparatus 100 executes the control program stored in the HDD 514.

In step S1301, the CPU 511 causes the UI control unit 703 to send a request to acquire scan setting information to the service communication router 708. The service communication router 708 sends the received acquisition request to the service A service communication unit 709. The service A service communication unit 709 acquires scan setting information from the scan/print setting DB 711 according to the received acquisition request. The service A service communication unit 709 returns the scan setting information as a response to the acquisition request to the service communication router 708. The service communication router 708 returns the scan setting information as a response to the acquisition request to the UI control unit 703.

In step S1302, the CPU 511 causes the UI control unit 703 to request the scan setting UI 704 to generate and display a UI. The scan setting UI 704 displays the scan setting screen 900, for example, on the operation unit 519. In the case, the scan setting UI 704 refers to the scan setting information, to switch a setting item or the like. If settable values corresponding to a setting item "file format" include "PDF" and "Tag Image File Format (TIFF)", for example, the scan setting UI 704 performs control so that buttons displayed as the file format button at the left of the file format selection setting 901 include only "PDF" and "TIFF". More specifically, the scan setting UI 704 generates, from information representing a data format that can be processed by a service, information representing a screen on which the data format that can be processed by the service can be selected. If settable values corresponding to a setting item "PDF" include "high-compression", "OCR", and so on, as illustrated in the scan/print setting DB 711, control is performed to display the high-compression specifying button 904 and the OCR specifying button 906 in the detailed setting 903.

In step S1303, the CPU 511 causes the scan setting UI 704 to include an input value (set value) set on the scan setting screen 900 in a request to execute scan processing, and to send the input value to the scan processing control unit 706 when a user operation for pressing the scan start button 909 is performed. The scan processing control unit 706 executes scan processing based on the received execution request.

In step S1304, the CPU 511 causes the scan processing control unit 706 to convert image data obtained from a scan processing execution result into a designated file format, for example, according to the input value set via the scan setting screen 900. In step S1305, the CPU 511 causes the scan processing control unit 706 to then send a scan data sending request including scan data having the file format obtained by the conversion, to the service communication router 708, and ends the processing. The service communication router 708 sends the received sending request to the service A service communication unit 709. The service A service communication unit 709 sends the scan data to the service A according to the received sending request.

Figure 14:
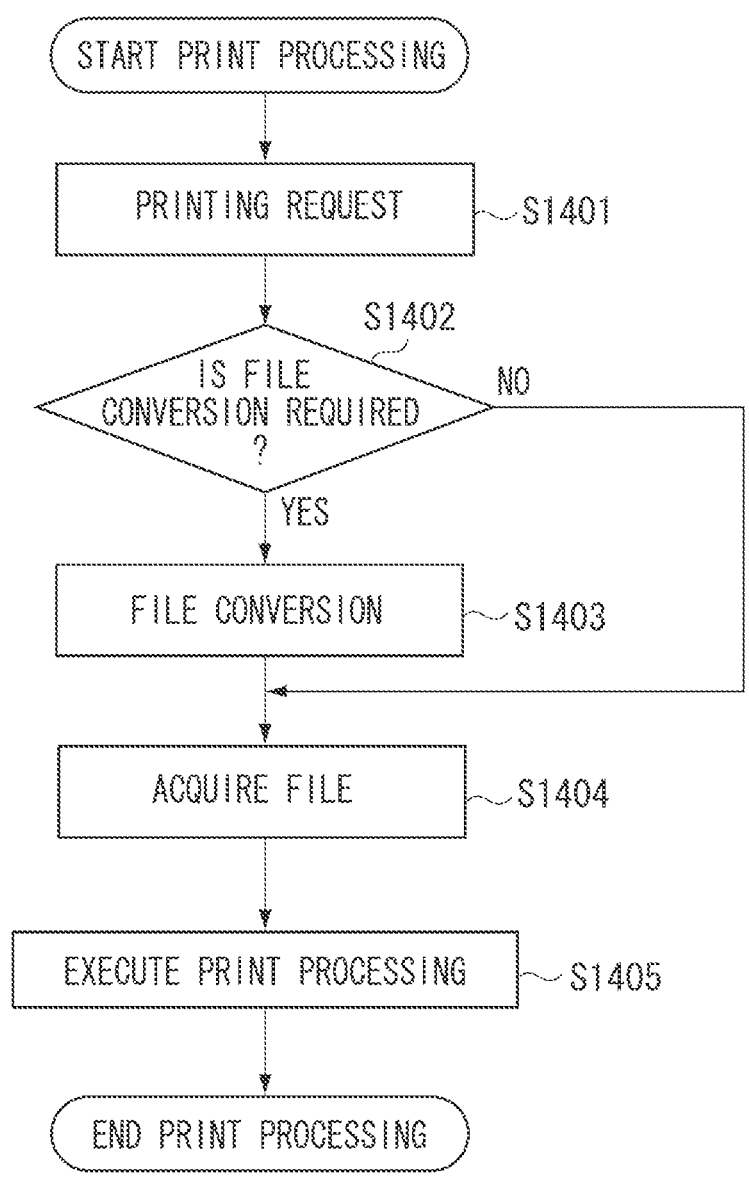
FIG. 14 illustrates an example of a flowchart relating to print processing.

FIG. 14 illustrates an example of a flowchart relating to print processing. Operations (steps) illustrated in the flowchart of FIG. 14 are implemented when the CPU 511 in the image processing apparatus 100 executes the control program stored in the HDD 514.

In step S1401, the CPU 511 causes the UI control unit 703 to send a file name of a file selected by a user operation and a printing request to print the file, to the print setting UI 705. The print setting UI 705, which has received the file name and the printing request, sends the file name and a request to acquire the file having the file name to the service communication router 708. The service communication router 708 sends the file name and the acquisition request to the service A service communication unit 709.

In step S1402, the CPU 511 causes the service A service communication unit 709 to call the printing file acquisition unit 710, and causes the printing file acquisition unit 710 to determine whether the file format of the file selected by the user operation needs to be converted (can be converted in the service A). In other words, the printing file acquisition unit 710 refers to the scan/print setting information 1000 which is an example of identification information, to identify data representing a file having a file format required to be converted in the service A. For example, the printing file acquisition unit 710 refers to the scan setting/print setting DB 711, to determine that the conversion in the service A is required when it is determined that a settable value "xx document" corresponding to a setting item "service conversion" and a file name match each other. If the printing file acquisition unit 710 determines that the conversion is required, the processing proceeds to step S1403. On the other hand, if the printing file acquisition unit 710 determines that the conversion is not required, the processing proceeds to step S1404.

In step S1403, the CPU 511 causes the printing file acquisition unit 710 to send a file conversion request to the service A to convert the file format of the file, which matches the settable value "xx document", selected by the user operation, into a printable file format (a PDF format in this example). The service A converts, when it receives the conversion request, the file that matches the settable value "xx document" selected by the user operation, into the file having the PDF format.

In step S1404, the CPU 511 causes the printing file acquisition unit 710 to send a file acquisition request to the service A to acquire a file itself having a file name or a file conversion result in step S1403. By the service A that has received the acquisition request, file data having the designated file name is acquired and returned as a response to the printing file acquisition unit 710. Therefore, the printing file acquisition unit 710 acquires file data included in a response to the acquisition request, from the service A.

The printing file acquisition unit 710 sends the acquired file data to the service A service communication unit 709, and the service A service communication unit 709 returns the file data as a response to a printing request to the service communication router 708. The service communication router 708 that has received the file data returns the file data to the print setting UI 705 as the response to the printing request. The print setting UI 705 that has received the file data sends the received file data to the print processing control unit 707.

In step S1405, the CPU 511 causes the print processing control unit 707 that has received the file data to perform print processing for the received file data, and ends the processing.

As described above, according to the present exemplary embodiment, in the image processing apparatus that cooperates with external services connected via a network, the increase in the number of external services, which send and receive data to and from the image processing apparatus, can be dealt with by adding mounting codes for only processing units dependent on the external services. More specifically, the image processing apparatus can realize a new external service by adding mounting codes for the service A startup processing unit 701 and the service A service communication unit 709 respectively corresponding to external services to be added. The processing units dependent on the external services commonly use a processing unit (a module) on which a commonly usable function is mounted. According to this configuration, the mounting code can be prevented from becoming huger due to the increase in the number of external services, for example.

According to the present exemplary embodiment, the functions of the image processing apparatus can be limited according to an external service (cloud service) provided by the external server serving as a communication partner. According to the present exemplary embodiment, the image processing apparatus can realize the new cloud service without correcting the mounting codes corresponding to the basic functions of the image processing apparatus.

In the first exemplary embodiment, a user designates a file desired to be printed from the file name/folder name list 801 to perform printing. When printing is performed, however, the user may confirm a content of a file that will be printed, to check whether the file is to be printed. The user can avoid a situation in which an erroneous file is printed by checking whether the file is to be printed.

On the other hand, when a file to be printed is acquired from a service connected via a network and printed, a content of the file to be printed may not be confirmed unless the file is acquired. In a configuration in which the file to be printed is acquired, if the file size of the file to be printed is large, a time is required to acquire the file, which is not convenient for the user.

In the second exemplary embodiment, a configuration is adopted in which a preview thumbnail (a thumbnail image) for confirming a content of a file is acquired and displayed in processing dependent on a service.

Figure 15:
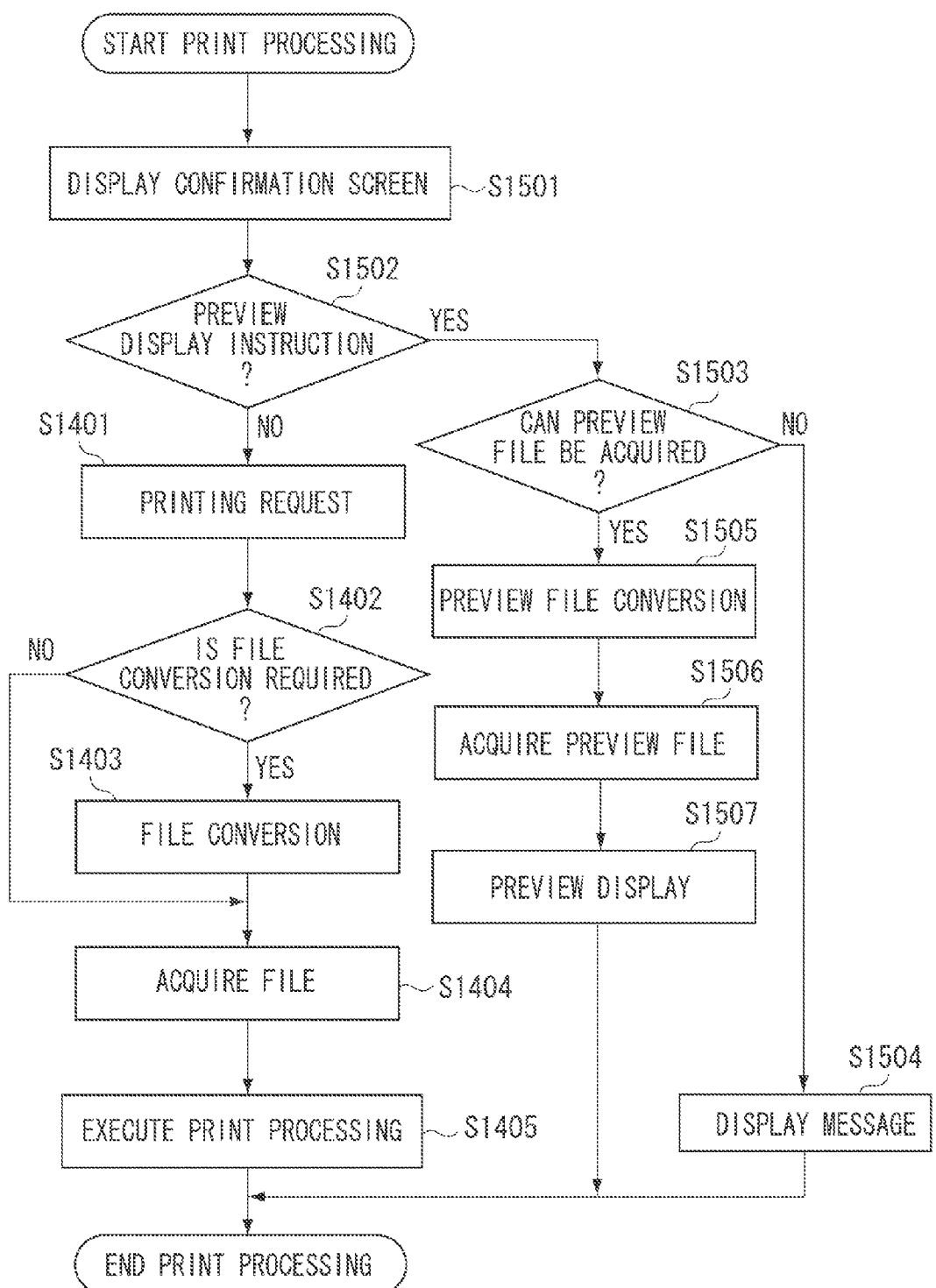
FIG. 15 illustrates an example of a flowchart relating to print processing.

FIG. 15 illustrates an example of a flowchart relating to print processing according to the present exemplary embodiment. Operations (steps) illustrated in the flowchart of FIG. 15 are implemented when a CPU 511 in an image processing apparatus 100 executes a control program stored in a HDD 514. FIG. 15 illustrates an example of the processing in step S1109 illustrated in FIG. 11 in the first exemplary embodiment. Steps S1401 to S1405 illustrated in FIG. 15 are similar to those illustrated in FIG. 14, and hence the description thereof is not repeated.

In step S1501, the CPU 511 causes a UI control unit 703 to display a configuration screen for confirming whether a print preview is to be displayed. More specifically, the UI control unit 703 displays on an operation unit 519 a screen on which a message "Is a preview displayed?" and a confirmation button (a "YES" button and "NO" button) are displayed. In other words, the UI control unit 703 generates, when data is selected on a screen on which printable data can be selected (e.g., an initial screen 800), screen information representing a screen on which an instruction to preview the selected data (data to be printed) can be given.

In step S1502, the UI control unit 703 determines that a preview display instruction is given when the user presses the "YES" button on the confirmation screen, and determines that a print instruction is given when the "NO" button is pressed. If the UI control unit 703 determines that the preview display instruction is given, the processing proceeds to step S1503. On the other hand, if the print instruction is given, the processing proceeds to step S1401.

In step S1503, the CPU 511 causes the UI control unit 703 to send a file name and a request to acquire a thumbnail image to a service communication router 708. The service communication router 708 sends the file name and the acquisition request to a service A service communication unit 709. The service A service communication unit 709 refers to the file name, to determine whether a thumbnail image can be acquired in a service A. For example, the service A service communication unit 709 refers to a scan setting/print setting DB 711. The service A service communication unit 709 determines that the service A can acquire the thumbnail image when it is determined that a settable value "xx document" corresponding to a setting item "preview display" and the file name match each other.

At this time, if it is determined that the thumbnail image can be acquired (YES in step S1503), the processing proceeds to step S1505. On the other hand, if it is determined that the thumbnail image cannot be acquired (NO in step S1503), the processing proceeds to step S1504.

In step S1504, the CPU 511 causes the service A service communication unit 709 to return a message that the thumbnail image cannot be acquired as a response to the acquisition request to the service communication router 708. The service communication router 708 returns the message that the thumbnail image cannot be acquired as the response to the acquisition request, to the UI control unit 703. The UI control unit 703, which has received the response to the acquisition request, displays the message that the thumbnail image cannot be acquired on the operation unit 519, to make a screen transition to an initial screen in response to a user operation.

In step S1505, the CPU 511 causes the service A service communication unit 709 to send to the service A a file conversion request indicating that a file having a file name is converted into a file having a preview display format such as a Joint Photographic Expert Group (JPEG) (a thumbnail image). The service A converts, when it receives the conversion request, a file having a file name designated by the user operation into the file having the preview display format.

In step S1506, the CPU 511 causes the service A service communication unit 709 to then send to the service A a request to acquire a file indicating that a file conversion result in step S1505 is acquired. The service A that has received the acquisition request acquires file data after the conversion, and returns the acquired file data as a response to the service A service communication unit 709. Therefore, the service A service communication unit 709 acquires the file data included in the response to the acquisition request, from the service A.

In step S1507, the CPU 511 causes the service A service communication unit 709 to return the file data acquired as the response to the request to acquire the thumbnail image to the service communication router 708. The service communication router 708, which has received the file data, returns the file data acquired as the response to the acquisition request to a print setting UI 705. The print setting UI 705 displays the received file data on the operation unit 519.

When the preview has been displayed by the user operation, the UI control unit 703 displays the initial screen. The above-mentioned configuration enables the user to confirm the file data from the preview, and then to perform a user operation for giving a printing instruction to print desired file data.

As described above, according to the present exemplary embodiment, the processing can be switched depending on an output destination (a recording medium or a liquid crystal display unit) in the processing dependent on the external services. Thus, each of the external services can be dealt with by changing a mounting code according to the external service in the processing dependent on the external service while an increase in the number of mounting codes in the whole image processing apparatus 100 can also be suppressed.

The present invention has also been implemented by executing processes, described below. More specifically, software (a program) for implementing functions in the above-mentioned exemplary embodiments is supplied to a system or an apparatus via a network or various types of recording media, and a computer (e.g., a CPU or a micro processing unit (MPF)) in the system or the apparatus reads out the program and executes the program.

The configuration according to the above-mentioned exemplary embodiment can deal with an increase in the number of cooperating services more appropriately.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-189473 filed Aug. 26, 2010, which is hereby incorporated by reference herein in its entirety.

What is claimed is:

1. An image forming apparatus comprising:
a plurality of individual processing units respectively corresponding to a plurality of services that cooperate with the image forming apparatus via a network and configured to communicate with the services and perform individual processing corresponding to the services;
a specifying unit configured to specify an individual processing unit corresponding to the service selected out of the plurality of services in response to a user operation, from the plurality of individual processing units; and
a generation unit serving as a module commonly used among the plurality of individual processing units and configured to generate screen information corresponding to the individual processing unit specified by the specifying unit based on the information managed by the individual processing unit,
wherein the information managed by the individual processing unit further includes identification information for identifying data having a data format required to be converted, and
wherein the individual processing unit requests the service to convert the data format of the data to be printed and acquires data after the conversion from the service when it determines that the data to be printed is the data having a data format required to be converted based on the information representing the data managed in the service and the identification information.

2. The image forming apparatus according to claim 1,
wherein the individual processing unit specified by the specifying unit acquires from the service corresponding to the individual processing unit information representing data managed in the service, and
wherein the generation unit generates screen information representing the data managed in the service based on the information representing the data managed in the service, which has been acquired by the individual processing unit.

3. The image forming apparatus according to claim 2,
wherein the information managed by the individual processing unit includes information representing printable data,
wherein the generation unit generates, based on the information representing the data managed in the service and the information representing the printable data, information representing a screen on which the printable data can be selected as a printing object out of the data managed in the service, and
wherein the individual processing unit acquires the data to be printed, which has been selected via the screen represented by the screen information, from the service.

4. The image forming apparatus according to claim 1,
wherein the information managed by the individual processing unit further includes preview information indicating whether preview data used for previewing the data to be printed can be acquired from the service,
wherein the generation unit generates information representing a screen on which an instruction to preview the data to be printed can be given, and
wherein the individual processing unit acquires the preview data from the service, when it determines that the preview data corresponding to the data to be printed can be acquired from the service based on the information representing the data managed in the service and the preview information.

5. The image forming apparatus according to claim 4, further comprising
a conversion unit configured to convert a data format of image data obtained by scanning a document,
wherein the information managed by the individual processing unit specified by the specifying unit includes information representing a data format that can be processed by the service corresponding to the individual processing unit,
wherein the generation unit generates, based on the information representing the data format that can be processed by the service, information representing a screen on which the data format that can be processed by the service can be selected, wherein the conversion unit converts the image data into a data format selected via the screen represented by the screen information, and wherein the individual processing unit sends data after the conversion by the conversion unit to the service.

6. The image forming apparatus according to claim 1, wherein the information managed by the plurality of individual processing units each includes at least one of information representing scan setting and information representing print setting, and is stored in a storage device corresponding to the plurality of services.

7. A service cooperation method in an image forming apparatus, the service cooperation method comprising:

specifying, from a plurality of individual processing units respectively corresponding to a plurality of services that cooperate with the image forming apparatus via a network and configured to communicate with the services and perform individual processing corresponding to the services, the individual processing unit corresponding to a service selected out of the plurality of services in response to a user operation; and generating, as a process of a module commonly used among the plurality of individual processing units, screen information corresponding to the individual processing unit specified by the specifying based on the information managed by the individual processing unit, wherein the information managed by the individual processing unit further includes identification information for identifying data having a data format required to be converted, and wherein the individual processing unit requests the service to convert the data format of the data to be printed and acquires data after the conversion from the service when it determines that the data to be printed is the data having a data format required to be converted based on the information representing the data managed in the service and the identification information.

8. A non-transitory storage medium storing a program for causing an image forming apparatus to function as:

a plurality of individual processing units respectively corresponding to a plurality of services that cooperate with the image forming apparatus via a network and configured to communicate with the services and perform individual processing corresponding to the services;

a specifying unit configured to specify an individual processing unit corresponding to the service selected out of the plurality of services in response to a user operation, from the plurality of individual processing units; and a generation unit serving as a module commonly used among the plurality of individual processing units and configured to generate screen information corresponding to the individual processing unit specified by the specifying unit based on the information managed by the individual processing unit, wherein the information managed by the individual processing unit further includes identification information for identifying data having a data format required to be converted, and wherein the individual processing unit requests the service to convert the data format of the data to be printed and acquires data after the conversion from the service when it determines that the data to be printed is the data having a data format required to be converted based on the information representing the data managed in the service and the identification information.

* * * * *